Patented Mar. 27, 1934

1,952,120

UNITED STATES PATENT OFFICE 1,952,120

REFRACTORY AND METHOD OF MAKING SAME

George F. Comstock, Niagara Falls, N. Y., assignor to The Titanium Alloy Manufacturing Company, New York, N. Y., a corporation of Maine No Drawing. Application April 21, 1931, Serial No. 531,856

8 Claims. (Cl. 106—9)

My invention relates to the making of refractory shapes more particularly applied to a novel binder for calcined magnesite consisting of zircon by means of which magnesite bricks when suitably fired have many improved properties over those heretofore produced.

Ordinary magnesite bricks are useful for many purposes where slag resistance is very important, but suffer from the disadvantages of shrinkage and cracking at high temperatures, and serious spalling at even moderately rapid changes of temperature. These defects have been decreased more or less by the use of electrically-fused magnesia in place of calcined magnesite, but the fusion process is rather costly.

By my process hereinafter described practically the same results may be obtained without using fused magnesia, through the use of zircon, without any clay, for bonding the calcined magnesite.

Mixtures of magnesite and zircon have been described by others, but the combination has not been made in the same way or with the same results as in my process. For instance, it was shown by Rees and Chesters, (Trans. Ceramic Soc., London, vol. 29, p. 309, May 1930), that certain mixtures of magnesite, zircon and ball clay, when fired to 2550° F. expanded instead of shrinking, and formed a new refractory compound, while these substances, when mixed in other proportions and heated, formed a comparatively fusible slag.

The mixture of equal parts of zircon and magnesite by weight, with 5% ball clay, was found to show the maximum expansion due to the formation of the refractory compound, while the mixture of two parts magnesite to eight parts zircon, with 5% ball clay, formed the most fusible slag.

According to my improved methods a comparatively fusible mixture of magnesite and zircon is used as a binder for the magnesite grains without any clay. A pure grade of magnesite should be used for maximum refractoriness, and it should be thoroughly calcined and crushed so as to pass a screen of about ¼ in. mesh. The fines are separated from the coarser particles, and mixed with refined zircon sand in the proportion of about 20% fine magnesite (or from 15 to 25%) to about 80% zircon. Milling of these materials together is advantageous. This mixture is then pressed, with the aid of some convenient organic binder such as lignin or goulac or weak sodium silicate solution, into bricks which are fired to the softening temperature which is about 2850° F.

These bricks are then broken up and crushed to a fine powder, at least 90% of which should pass through a 200-mesh screen, and this powder is used as a binder for the coarser particles of magnesite to be used. From 20 to 40% of the powdered zircon-magnesite compound is used with 80 to 60% of the coarser magnesite; the composition which I have found preferable being 30% of the fine compound to 70% magnesite. Some attention to sizing of the magnesite is advantageous, and good results have followed from the use of 60% coarser than 20 mesh and 10% finer than 100 mesh. No clay is required, but an organic temporary binder such as lignin or goulac, or very weak sodium silicate solution, may be used to facilitate the pressing and formation of shapes. After drying, the shapes are fired at a rate of not over 250° F. per hour to about 2800° F. for about an hour.

Bricks or shapes made according to my methods do not suffer any appreciable change in volume after firing, and may be used at temperatures up to 3000° F. without damage. The normal shrinkage of the coarser magnesite particles at high temperatures is compensated by the expansion arising from the formation of the zircon-magnesite refractory compound at the surfaces of the magnesite grains where they touch the high-zircon powder used as the permanent binder. The result is a suppression of the volume changes, and since diffusion is extremely sluggish in these mixtures even at high temperatures, the effect is practically permanent.

Whereas ordinary magnesite bricks crack and spall very readily on heating and cooling, I have found that the zircon-bonded magnesite bricks made as hereinbefore described are much more resistant to destruction from rapid changes of temperature. Their resistance as to the attack of fused iron oxide is practically as great as that of the plain magnesite.

Magnesite bricks may of course be made with a zircon bond by using plain zircon as the bonding agent, but the constancy of volume and resistance to spalling that are characteristic of bricks made in accordance with my method as hereinbefore described are not attained to the same degree. By the method described most of the advantages obtainable from the use of fused magnesia as the brick-making material are secured without incurring the expense of the electrical fusion.

I claim as my invention:—

1. A refractory comprising principally coarse-grained calcined magnesite, the particles of which are capable of passing through a 4 mesh screen, fired and bonded with relatively finely-divided particles of fusible zircon-magnesite compound to coalesce with said magnesite grains at about 2800° F.

2. A refractory comprising principally coarse-grained calcined magnesite about 70% of the mass, the particles of which are capable of passing through a 4 mesh screen, fired and bonded with relatively finely-divided particles of fusible zircon-magnesite compound to coalesce with said magnesite grains at about 2800° F.

3. A refractory comprising principally coarse-grained calcined magnesite about 70% of the mass, the particles of which are capable of passing through a 4 mesh screen, fired and bonded with relatively finely-divided particles of fusible zircon-magnesite compound consisting of about 80% zircon and about 20% magnesite to coalesce with said magnesite grains at about 2800° F.

4. A refractory having the qualities hereinbefore described and composed principally of relatively coarse calcined magnesite grains fired and bonded with a more finely-divided fused zircon-magnesite compound at about 2800° F. to produce coalescence through formation of the zircon-magnesite refractory compound at the surface of said magnesite grains.

5. A method of making refractories of magnesite which comprises mixing calcined magnesite and zircon, firing the charge to about the softening temperature, pulverizing the resulting mass, pressing to form a mixture of said pulverized zircon-magnesite compound and coarser-grained calcined magnesite with a binder, and then drying, and firing said form at about 2800° F.

6. A method of making refractories of magnesite which comprises mixing calcined magnesite and zircon, firing the charge to about the softening temperature, pulverizing the resulting mass, pressing to form a mixture of said pulverized zircon-magnesite compound and coarser-grained calcined magnesite with a binder, and then drying, and firing said form at about 2800° F. for about one hour.

7. A method of making refractories of magnesite which comprises mixing a major portion of coarse-grained calcined magnesite with a powdered zircon-magnesite mixture containing over 70% zircon, and then firing the charge mixed with a binder and formed for the refractory at a temperature, whereby normal shrinkage of the calcined magnesite grains is counteracted by expansion of the zircon-magnesite compounds formed on said magnesite grains.

8. A method of making refractories of magnesite which comprises mixing a major portion of coarse-grained calcined magnesite, the particles of which are capable of passing through a 4 mesh screen, with a powdered zircon-magnesite mixture containing over 70% zircon, and then firing the charge mixed with a binder and formed for the refractory at about 2800° F. for about one hour, whereby normal shrinkage of the calcined magnesite grains is counteracted by expansion of the zircon-magnesite compounds formed on said magnesite grains.

GEORGE F. COMSTOCK.